United States Patent [19]
Circello et al.

[11] Patent Number: 5,761,491
[45] Date of Patent: Jun. 2, 1998

[54] DATA PROCESSING SYSTEM AND METHOD FOR STORING AND RESTORING A STACK POINTER

[75] Inventors: Joseph C. Circello. Phoenix, Ariz.; Jefferson Gokingco. Austin, Tex.

[73] Assignee: Motorola Inc., Schaumburg, Ill.

[21] Appl. No.: 632,187

[22] Filed: Apr. 15, 1996

[51] Int. Cl.$^6$ .................... G06F 9/30; G06F 9/46
[52] U.S. Cl. ........................... 395/591; 395/571
[58] Field of Search ...................... 395/733, 591, 395/571

[56] References Cited

U.S. PATENT DOCUMENTS

| | | |
|---|---|---|
| 4,250,546 | 2/1981 | Boney et al. |
| 4,488,227 | 12/1984 | Miu et al. |
| 4,517,643 | 5/1985 | Bannai |
| 5,036,458 | 7/1991 | Matsushima et al. |
| 5,201,043 | 4/1993 | Crawford et al. ............ 395/575 |
| 5,481,719 | 1/1996 | Ackerman et al. ............ 395/700 |
| 5,634,046 | 5/1997 | Chatterjee et al. ............ 395/568 |
| 5,640,548 | 6/1997 | Langan et al. ............ 395/561 |

FOREIGN PATENT DOCUMENTS

| | | |
|---|---|---|
| 97 10 5543 | 7/1997 | European Pat. Off. |
| 2 007 887 | 5/1979 | United Kingdom |

OTHER PUBLICATIONS

European Search Report Communication Transmittal, dtd Aug. 13, 1997, Application No. 97105543.9, SC03149A/ Circel, Assignee Motorola, Inc.

*Primary Examiner*—Krisna Lim

[57] ABSTRACT

A data processor (3) implements a single system stack pointer (244) to create records of both supervisor and user stack operations when hardware support for misalignment of such stack operations is optional. The single system stack pointer is implemented as a self-aligning stack pointer which automatically aligns itself to a nearest 0-modulo-4 address below a current address setting such that no alignment system errors occur even when there is no hardware support for misaligned operands. Once the automatic alignment has occurred, the data processor stores a format field in an exception stack frame to indicate information about the alignment of the stack pointer at the time of the error. When the exception has been serviced, the processor uses the four bit format field stored in the exception stack frame to restore the stack pointer to its original value at the time of the exception.

12 Claims, 6 Drawing Sheets

DATA PROCESSING SYSTEM AND METHOD FOR STORING AND RESTORING A STACK POINTER

CROSS REFERENCE TO A RELATED APPLICATION

This application is related to our commonly assigned patent entitled:

"Method and Apparatus for Unstacking Registers in a Data Processing System," U.S. Pat. No. 5,640,548, assigned to Motorola, Inc., and having inventors John A. Langan et al.

1. Field of the Invention

The present invention relates in general to a data processing system, and more particularly to a stack pointer in a data processing system.

2. Background of the Invention

In data processing systems, stack pointers are hardware registers typically used as a memory address pointer for defining the memory locations for program variables and temporary storage. Traditionally, one or more registers within the programming model is used by the hardware as the system stack pointer. In many systems, the stack pointer is implicitly used by the instruction set during the execution of certain operations. Generally, this address register defines the top of a current stack frame where operands can be passed between functions by "pushing" the data onto the memory stack. This push operation can consist of decrementing the stack pointer and then copying the data to the location defined by the new stack pointer address. After the data has been used by a routine, the data is deallocated by simply incrementing the stack pointer to return it to a previous value. This process is known as "popping" the stack.

Since these stack pointers generally define the memory addresses, user programs routinely manipulate the contents of the stack pointer which defines the top of the stack. Operands of various sizes, such as bytes, words, longwords, etc., may be pushed onto the stack so that the top of the stack may point to any allowable alignment at any time. Processors which provide automatic hardware support of any operand size on any operand address alignment are said to support misalignment. An operand is said to be misaligned if its memory address does not correspond to its natural boundary. The natural boundary is simply defined as an address 0-modulo-(operand size). For example, a sixteen bit word operand is aligned if the memory byte address is 0-modulo-2 and a thirty-two bit longword is aligned if the memory bye address is 0-modulo-4. Alignments which fail this definition result in misaligned operands.

Most processors include hardware support for various types of exception processing. These exceptions, also known as faults, typically include interrupts, system calls, and arithmetic error conditions. Other exceptions may also occur. Generally, when an exception is detected, the processor will create a special exception frame on the top of the system stack detailing the context of the machine at the time of the fault. After this exception stack frame is created, the processor passes control to a special exception handling routine by transferring control to the instruction address specified by the exception type. Generally, the exception handling routine will process the fault, perhaps initiating some type of corrective action, and then return to the application executing at the time of the exception.

Most processors employ some type of special error detection so that certain catastrophic fault conditions occurring during the processing of any other exception will produce a total system failure and simply cause the processor to halt. Often included in this special set of catastrophic fault conditions is the alignment of the system stack pointer on certain boundaries. In order to compensate for this possibility, prior art systems have implemented several different solutions which require a significant amount of hardware. For example, most prior art solutions require a hardware circuit which ensures that no operands will be misaligned. These solutions have typically implemented multiple stack pointers based on the operating mode of the processor. This operating mode typically defines the level of privilege associated with the executing program, and in its simplest form usually consists of two levels of privilege: supervisor (most privileged) and user (least privileged). Execution in supervisor mode provides complete access to all the resources of the system, while user mode execution is denied access to certain hardware resources. In addition, many processors provide dedicated hardware circuitry to enforce a required alignment of the stack pointer in the data processing system. Note, in each of the prior art solutions, the dedicated hardware circuitry and the corresponding overhead costs are required.

For data processing systems which are unable to implement such expensive hardware circuitry, software solutions have been developed. When using such a software solution, concurrent exceptions are not allowed. Stated another way, once an exception has been taken by the data processing system, other exceptions are not allowed. Otherwise, if another exception may not be masked and is asserted, then the status and program counter information of the machine context will be overwritten. Thus, the data processing system will be unable to return to the state before the first exception was processed. Thus, in this second type of prior art system, the data processing system is unable to effectively process all exceptions correctly.

As can be seen, present prior art solutions require significant additional hardware circuitry to correctly restore a data processing system to its initial state after an exception is asserted and processed. Therefore, a need exists for a solution which allows a designer of the data processing system to optionally include a hardware support for operand misalignment while still ensuring that the data processing system will correctly process all exceptions, regardless of system stack pointer alignment, and recover the initial state after exception handling.

DESCRIPTION OF THE PREFERRED EMBODIMENTS

The present invention provides a data processor and method of operating a data processing system in which a single system stack pointer may be used to create records of both system and user stack operations when hardware support for alignment of such stack operands is optional. The single system stack pointer is implemented as a self-aligning stack pointer. Stated simply, this self-aligning stack pointer automatically aligns itself to a nearest 0-modulo-4 address below the current address setting such that no alignment system errors occur even when there is no hardware support for misaligned operands. Once the automatic alignment has occurred, the data processor of the present invention stores a four bit format field in an exception stack frame to indicate information about the alignment of the stack pointer at the time of the fault. When the exception has been serviced and a return from exception (RTE) instruction is executed, the processor uses the four bit format field stored in the exception stack frame to restore the stack pointer to its original value at the time of the exception.

The present invention provides a data processor and method of operation in which a single stack pointer is used to support both the supervisor and user stack areas of a data processing system. Furthermore, in the present invention, hardware dedicated to operand misalignment may be implemented, but is not required. The ability of this single stack pointer to align itself during exception processing allows the data processor to ensure that the data processing system will not experience a catastrophic error if an exception occurs while the stack pointer is misaligned. Operation of the present invention will subsequently be discussed in greater detail.

In a following discussion, the connectivity and operation of the data processing system which implements the present invention will be provided in greater detail.

Connectivity of the Present Invention

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And, if the logically true state is a logic level a zero, the logically false state will be a logic level one.

Furthermore, the symbol "$" preceding a number indicates that the number is represented in its hexadecimal or base sixteen form. The symbol "%" preceding a number indicates that the number is represented in its binary or base two form.

Figure 1:
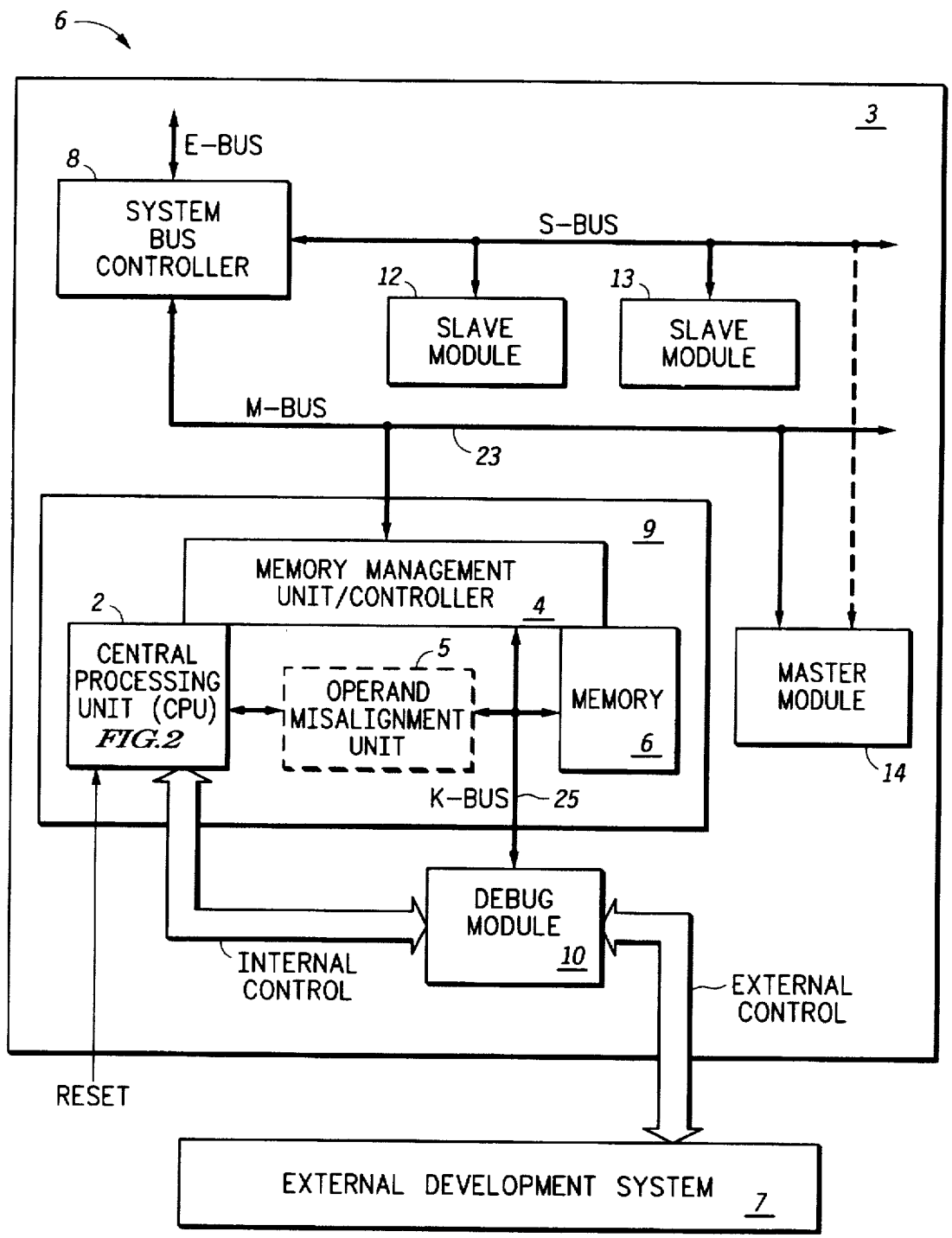
FIG. 1 illustrates, in block diagram form, a data processing system in accordance with one embodiment of the present invention.

Referring now to FIG. 1, FIG. 1 illustrates a data processing system 6 in accordance with one embodiment of the present invention. Data processing system 6 comprises a data processor 3 and an external development system 7. Data processor 3 includes a system bus controller 8, a processor core 9, a slave module 12, a slave module 13, a master module 14, and a debug module 10. System bus controller 8 is coupled to an external device (not illustrated herein) via an E-Bus. System bus controller 8 is coupled to slave module 12 and slave module 13 via an S-Bus. The S-Bus is a slave module bus. System bus controller 8 is coupled to processor core 9 and master module 14 via an M-Bus 23. M-Bus 23 is a master module bus.

Processor core 9 comprises a central processing unit (CPU) 2, a memory management unit (MMU)/controller 4, and a memory 6. An operand misalignment unit 5 may also be selectively included in processor core 9. Central processing unit 2, MMU/controller 4, memory 6, and debug module 10 are each coupled to one another via a K-Bus 25. Both central processing unit 2 and memory 6 are also directly connected to MMU/controller 4. MMU/controller 4 provides information to a remaining portion of data processing system 6 via a M-Bus 23. Central processing unit 2 is coupled to debug module 10 to provide an Internal Control Bus. CPU 2 also receives a Reset signal from an external device (not illustrated herein). Debug module 10 bidirectionally communicates to an external development system 7 using the external control bus. External development system 7 is an optional device external to data processing system 5.

Figure 2:
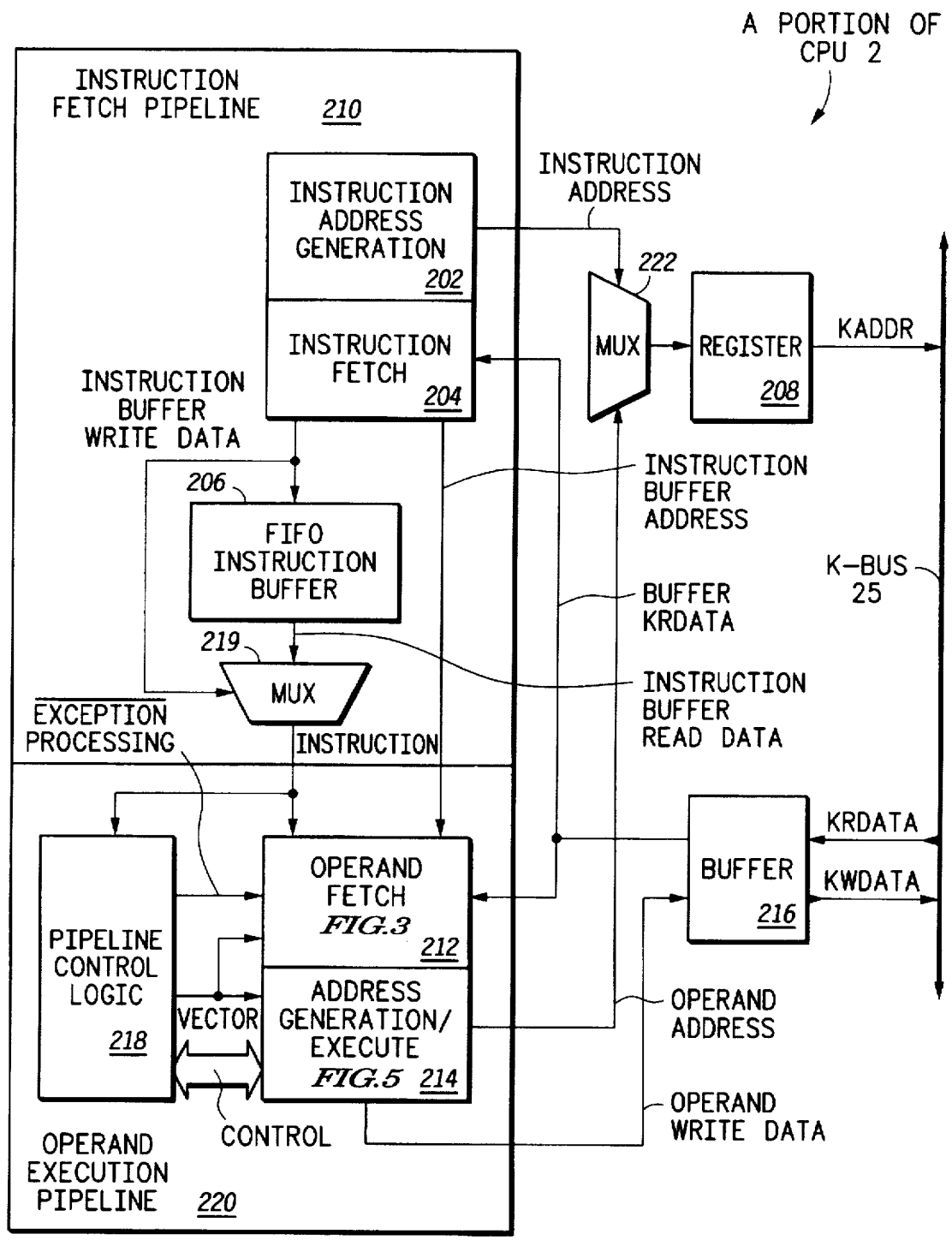
FIG. 2 illustrates, in block diagram form, a portion of the central processing unit of the data processing system illustrated in FIG. 1.

FIG. 2 illustrates a portion of CPU 2 in greater detail. CPU 2 includes a register 208, an instruction fetch pipeline 210, a buffer 216, an operand execution pipeline 220, and a multiplexer (MUX) 222. Instruction fetch pipeline 210 comprises an instruction address generation circuit 202, an instruction fetch circuit 204, a FIFO instruction buffer 206, and a multiplexer 219. Additionally, operand execution pipeline 220 comprises an operand fetch circuit 212, an address generation/execute circuit 214, and a pipeline control logic 218.

Instruction address generation circuit 202 of instruction fetch pipeline 210 provides the Instruction Address signal to multiplexer 222. Multiplexer 222 selects between instruction addresses from instruction fetch pipeline 210 and operand addresses from operand execution pipeline 220 for subsequent transactions on K-Bus 25. Register 208 outputs a KADDR (K-Bus Address) signal. Instruction fetch circuit 204 of instruction fetch pipeline 210 is coupled to operand fetch circuit 212 and buffer 216 to receive a buffered KRDATA signal. Instruction fetch circuit 204 is coupled to operand fetch circuit 212 to provide an Instruction Fetch Address. Instruction fetch circuit 204 is also coupled to FIFO instruction buffer 206 and multiplexer 219 to provide an Instruction Buffer Write Data signal. FIFO instruction buffer 206 is coupled to multiplexer 219 to provide an Instruction Buffer Read Data signal. Multiplexer 219 is coupled to operand fetch circuit 212 of operand execution pipeline 220 to provide an Instruction signal.

Pipeline control logic 218 of operand execution pipeline 220 is coupled to operand fetch circuit 212 to provide an Exception Processing signal. Pipeline control logic 218 is also coupled to address generation/execute circuit 214 to provide a control bus. Pipeline control logic 218 is coupled to both operand fetch circuit 212 and address generation/ execute circuit 214 to provide a Vector signal. Address generation/execute circuit 214 of operand execution pipeline 220 is coupled to multiplexer 222 to provide an Operand Address signal. As well, address generation/execute circuit 214 is coupled to buffer 216 to provide an Operand Write Data signal. Buffer 216 provides a KRDATA (K-Bus Read Data) signal and a KWDATA (K-Bus Write Data) signal. Each of the KRDATA, KWDATA, and KADDR signals are provided to K-Bus 25.

Figure 3:
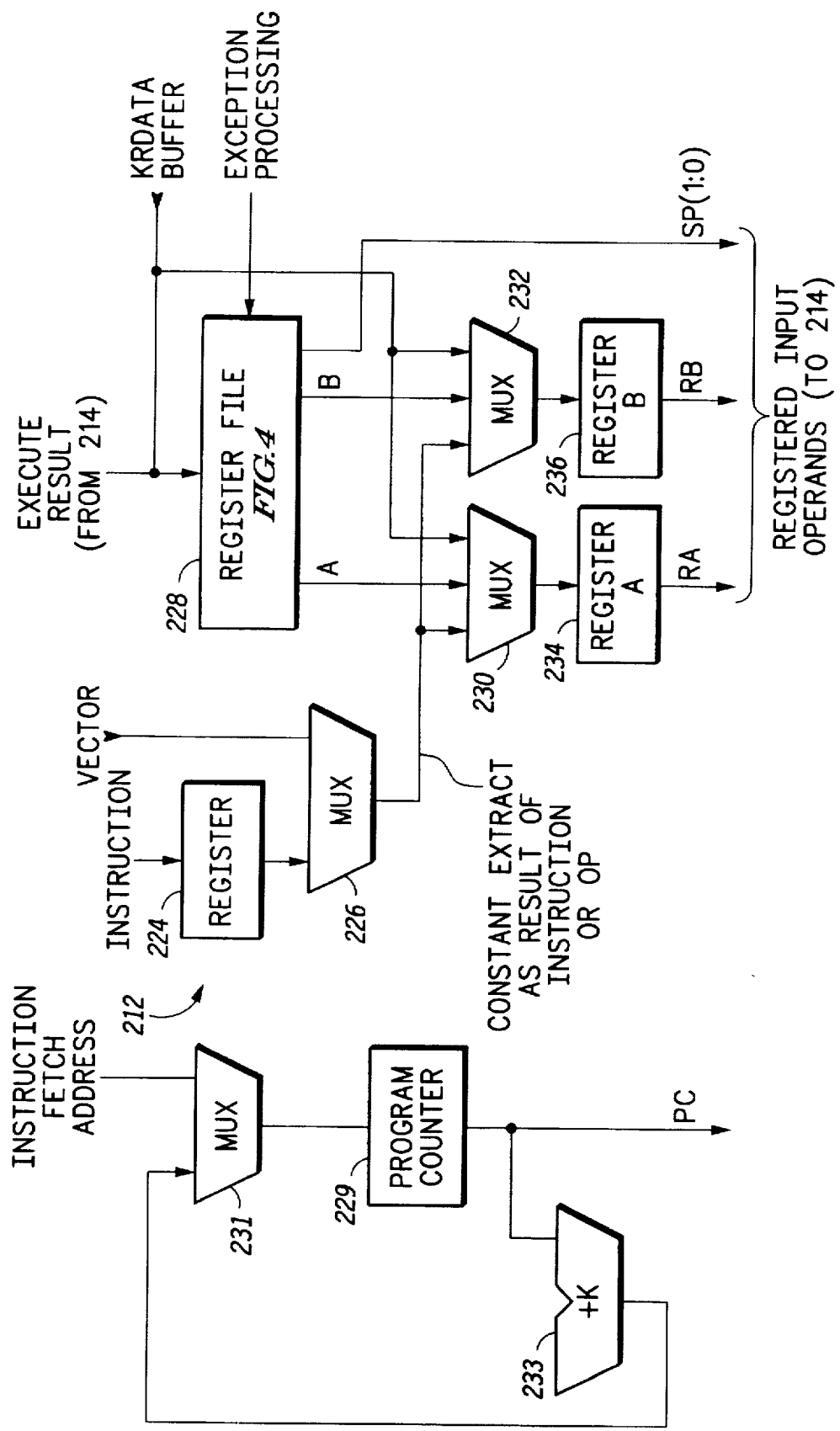
FIG. 3 illustrates, in block diagram form, an operand fetch circuit of the central processor unit illustrated in FIG. 2.

FIG. 3 illustrates operand fetch circuit 212 in greater detail. Operand fetch circuit 212 comprises a register 224, a multiplexer 1 (MUX) 226, a register file 228, a program counter register 229, a multiplexer 2 (MUX) 230, a multiplexer 231, a multiplexer 3 (MUX) 232, an adder 233, a register A 34, and a register B 236.

An Instruction signal is provided to register 224 from multiplexer 219 of FIG. 2. Register 224 of FIG. 3 is coupled to a first input of multiplexer 1 226 and the Vector signal is coupled to a second input of multiplexer 1 226. Multiplexer 1 226 provides constants and immediate operands, as specified by an instruction stored in register 224, to multiplexer 2 230 and multiplexer 3 232. An Execute Result signal is coupled to register file 228 and to each of multiplexer 2 230 and multiplexer 3 232. Register file 228 is coupled to multiplexer 2 230 to provide an "A" signal and is coupled to multiplexer 3 232 to provide a "B" signal. Additionally, register file 228 provides an SP(1:0) signal. The SP(1:0) signal provides bits zero and one of a Stack Pointer value stored in register file 228. Multiplexer 2 230 is coupled to register A 234 and multiplexer 3 232 is coupled to register B 236. Register A 234 provides a RA signal. Register B 236 provides a RB signal. The RA and RB signals are provided as registered input operands to address generation/execute circuit 214.

The Instruction Fetch Address signal is provided to a first input of multiplexer 231. An output of multiplexer 231 is provided to program counter register 229. Program counter register provides a PC (Program Counter) signal as an output and to an input of adder 233. Adder 233 is used to calculate a next sequential program counter value with its output connected to a second input of multiplexer 231. As CPU 2 executes instructions, the contents of program counter register 229 represent the instruction address for the instruction stored in register 224.

Figure 4:
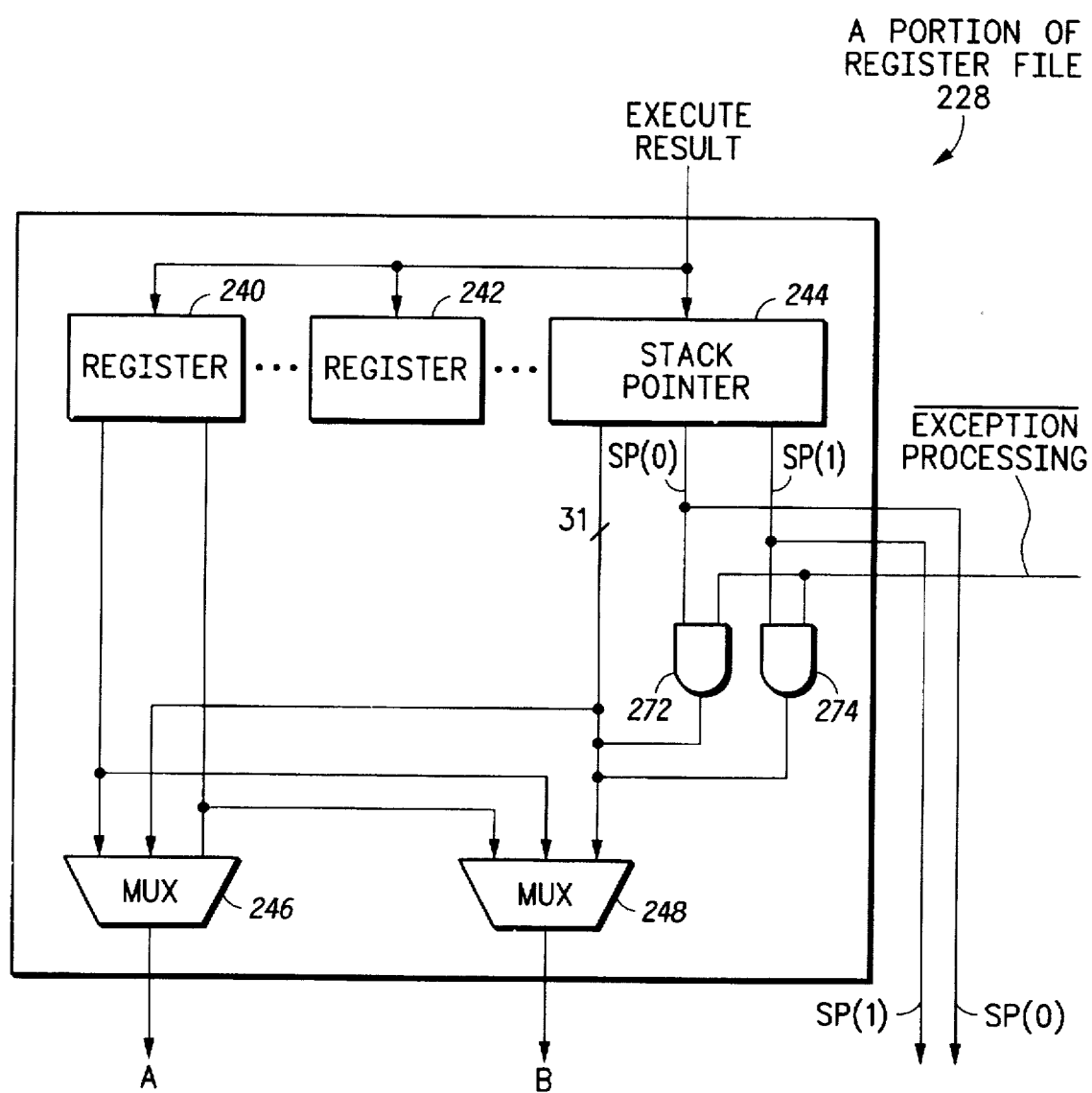
FIG. 4 illustrates, in block diagram form, a register file circuit of the operand fetch circuit illustrated in FIG. 3.

FIG. 4 illustrates register file 228 in greater detail. Register file 228 generally comprises all the programmable general-purpose machine registers implemented in CPU. Register file 228 is typically comprised of a multiplicity of registers, such as a register 240, a register 242, a stack pointer 244, a multiplexer 246, a multiplexer 248, and AND gate 272, and an AND gate 274. The Execute Result signal is provided to each of register 240, register 242, and stack pointer 244. The contents of each of register 240, register 242, and stack pointer 244, as well as the contents of other registers not specifically illustrated herein, but included in register file 228, are provided to each of multiplexers 246 and 248. Multiplexer 246 provides an "A" signal and multiplexer 248 provides a "B" signal.

Stack pointer 244 is a programmable register defined as a system stack pointer which provides a low order two bits of the contents of the stack pointer register as SP(1:0). These low order bits define the byte address within a thirty-two bit wide address space. The SP(1) signal provides bit one of a Stack Pointer value stored in stack pointer 244 of register file 228. Similarly, the SP(0) signal provides bit zero of a stack pointer value stored in stack pointer 244 of register file 228. The SP(1) signal is provided to a first input of AND gate 272 and the Exception Processing signal is provided to a second input of AND gate 272. An output of AND gate 272 is coupled to an input of multiplexer 248. Additionally, the SP(0) signal is provided to a first input of AND gate 274 and the Exception Processing signal is provided to a second input of AND gate 274.

Figure 5:
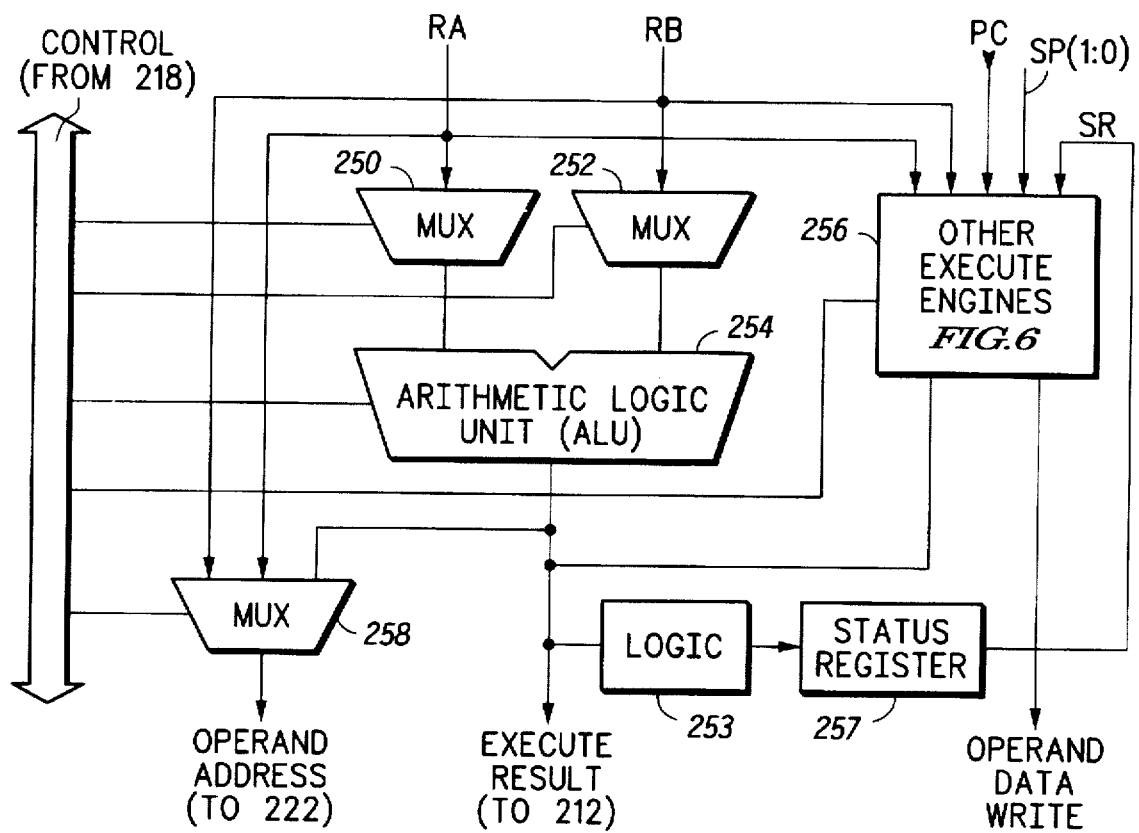
FIG. 5 illustrates, in block diagram form, an address generation/execution circuit of the central processor unit illustrated in FIG. 2.

FIG. 5 illustrates address generation/execute circuit 214 in greater detail. Address generation/execute circuit 214 comprises a multiplexer 4 250, a multiplexer 5 252, a logic circuit 253, an arithmetic logic unit (ALU) 254, an other execute engines circuit 256, a status register 257, and a multiplexer 6 258.

The RA signal provided by operand fetch circuit 212 is coupled to multiplexer 4 250, other execute engines circuit 256, and multiplexer 6 258. The RB signal provided by operand fetch circuit 212 is coupled to multiplexer 5 252, other execute engines circuit 256, and multiplexer 6 258. Multiplexer 4 250 and multiplexer 5 252 are each coupled to ALU 254. ALU 254 is coupled to multiplexer 6 258 to provide the Execute Result signal. Multiplexer 6 258 provides an Operand Address signal. An output of ALU 254 is the Execute Result signal and is coupled to an input of multiplexer 6 258. Multiplexer 6 258 then provides an Operand Address signal. Logic circuit 253 is coupled to status register 257 and status register 257 provides an SR (Status Register) signal. This is the programmable register defining the processor privilege level and miscellaneous control functions. It may also be known as the processor status word in other architectures. Additionally, the SP(1:0) signal, the PC signal, and the SR (Status Register) signal are provided to other execute engines circuit 256. Other execute engines circuit 256 provides an Operand Write Data signal and an Execute Result signal.

Figure 6:
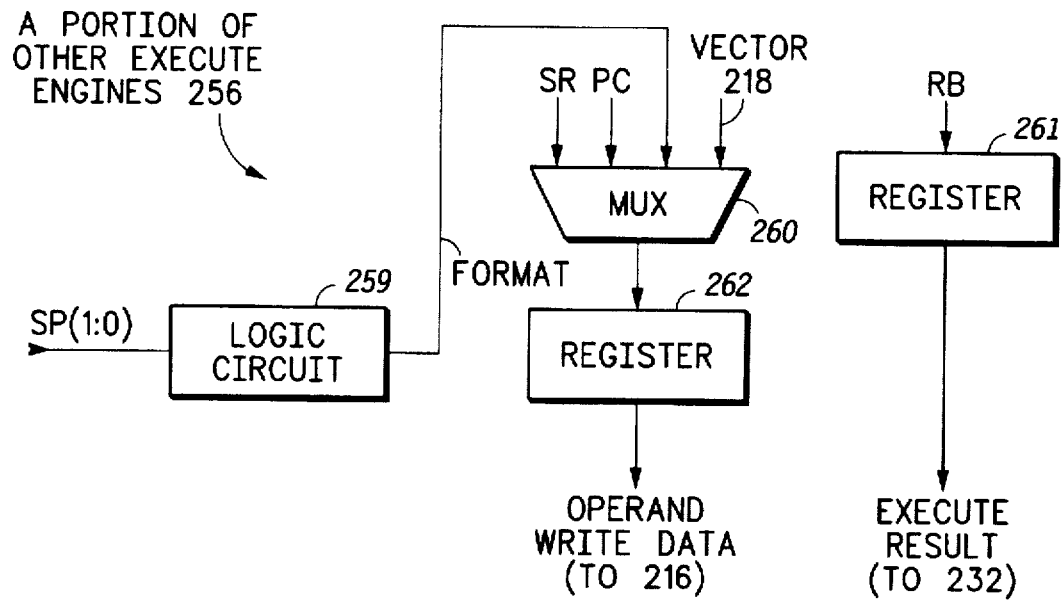
FIG. 6 illustrates, in block diagram form, a portion of an other execution engine of the address generation/execution circuit illustrated in FIG. 4.

FIG. 6 illustrates the other execute engines circuit 256 in greater detail. Other execute engines circuit 256 comprises a logic 259, a multiplexer 260, a register 261, and a register 262. The SP(1:0) signal is provided to an input of logic 259. An output of logic 259 is coupled to multiplexer 260 to provide a Format signal. The SR, PC, Format, Vector, and SP(1:0) signals are provided to multiplexer 260. Multiplexer 260 is coupled to register 262. Register 262 provides the Operand Write Data signal. Additionally, the RB signal is provided to register 261. Register 261 provides a Retrieved Format signal and also provides the Execute Result signal.

Description of Operation

During operation of data processing system 5, processor core 9 uses K-Bus 25 to connect CPU 2, MMU/Controller 4, and memory 6. Additionally, in the present invention, a user may choose to include operand misalignment unit 5. If operand misalignment unit 5 is included in data processor 3, K-Bus 25 connects it with each of CPU 2, MMU/Controller 4, and memory 6. In the present embodiment of the invention, K-Bus 25 is a high speed, single-cycle access bus. Memory 6 may include random access memory (RAM), read only memory (ROM), cache blocks and any combination thereof. All other system modules and peripherals are coupled to processor core 9 via M-Bus 23. M-Bus 23 is an internal multi-master bus which is used to perform data transfers initiated by one of multiple bus masters. System bus controller 8 provides multiple functions. System bus controller 8 provides an interface between internal M-Bus 23 and the external E-Bus, if the external E-Bus exists. Additionally, system bus controller 8 serves as a focal point for controlling all data transfers on the S-Bus. The S-Bus is used to connect simple slave peripheral modules (12 and 13) such as timers, serial communication channels, and memories into data processing system 5.

In the present invention, data processor 3 has several layers of bus bandwidth to provide a cost-effective mechanism for data transfers. Processor core 9 is interconnected with a high-speed, single cycle K-Bus 25 to maximize performance. For transfers not directly coupled to this high-speed bus, M-Bus 23 provides bandwidth from any of the internal bus masters such as processor core 9 and master module 14. System bus controller 8 provides a connection between the internal M-Bus 23 and the external E-Bus (if present), while also providing a control function for all data transfers on the low-cost, lower bandwidth S-Bus for slave peripheral modules such as slave modules 12 and 13. Debug module 10 is connected to K-Bus 25 to allow non-intrusive observation of all processor-initiated memory accesses. Debug module also provides the connections to the optional external development system 7. External development system 7 is typically connected during program debug and development during system integration testing. Data processor 3 is connected to external development system 7 to communicate information. External development system 7 communicates with data processor 3 via the External Control bus.

During a following discussion about operation of data processing system 5, assume that a user of data processor 3 has determined that overhead costs associated with the device should be reduced and has opted to implement data processor 3 without operand misalignment unit 5. If it were implemented in data processor 3, operand misalignment unit 5 would provide logic circuitry between CPU 2 and K-Bus 25 that would intercept misaligned references output by CPU 2. Operand misalignment unit 5 would then reconfigure the misaligned references to a series of aligned references. However, assume in the present embodiment of the invention, the user does not implement operand misalignment unit 5 in data processor 3.

As previously discussed, by failing to implement operand misalignment unit 5, a prior art data processor would generate an exception upon any attempted reference to a misaligned operand. If the misaligned reference occurred as part of the exception processing for another type of fault, then the catastrophic double fault condition occurs. For most data processing systems, such double exceptions are treated as catastrophic failures and often result in the data processor being halted until the system is reset. As previously mentioned, the present invention recognizes this problem and has provided a stack pointer which is self-aligning and, therefore, ensures that no misaligned references will be generated by CPU 2 in response to an exception. Operation of processor core 9 and CPU 2 of the present invention will now be described in greater detail.

While data processor 3 is operating, processor core 9 controls execution of the program and responds as required to external interrupts. CPU 2 is provided to quickly and efficiently process instructions with the use of instruction fetch pipeline 210 and operand execution pipeline 220. In the present embodiment of the invention, instruction fetch pipeline 210 and operand execution pipeline 220 are independent and decoupled.

During operation, instruction fetch pipeline 210 prefetches instructions for execution in processor core 9. Instruction address generation circuit 202 forms a prefetch address to be used in accessing a next instruction. The prefetch address is provided to register 208 via multiplexer 222. The prefetch address is provided to K-Bus 25 as the KADDR signal. CPU 2 initiates the required K-Bus 25 transfer to fetch the instruction located at the address defined by KADDR. The desired instruction may be located in memory 6, slave module 12, slave module 13 or a device connected to the E-Bus, if present. Regardless of the location of the desired instruction, the data is eventually routed back to CPU 2 via the KRDATA (K-Bus Read Data) signal. The KRDATA signal provides the instruction to buffer 216. Buffer 216 subsequently transfers the fetched instruction to instruction fetch circuit 204. Once the fetched instruction is provided to instruction fetch circuit 204, instruction fetch circuit 204 provides the Instruction Buffer Write Data signal to either FIFO instruction buffer 206 or multiplexer 219. FIFO instruction buffer 206 is bypassed and the Instruction Buffer Write Data signal is provided directly to multiplexer 219 when operand execution pipeline 220 is waiting for a next instruction. Otherwise the Instruction Buffer Write Data signal is provided to FIFO instruction buffer 206 and then to multiplexer 219.

From multiplexer 219 of instruction fetch pipeline 210, the Instruction signal is provided to both pipeline control logic 218 and operand fetch circuit 212 of operand execution pipeline 220. Additionally, instruction fetch circuit 204 of instruction fetch pipeline 210 provides the Instruction Fetch Address signal to operand fetch circuit 212. This Instruction Fetch Address signal is used to establish a new program counter register 229 value in response to change-of-flow instructions, such as taken branches. For simple instructions involving register operands, the operand execution pipeline acts as a two-stage pipeline. In the first stage, pipeline control logic 218 decodes the instruction and provides control information to operand fetch circuit 212. Concurrently, operand fetch circuit 212 accesses the required values stored in register file 228. In the second state, pipeline control logic 218 provides control signals to address generation/execute circuit 214 to perform the required data operation on the registered input operands, RA 234 and RA 236 using ALU 254 or the other execute engines 256. The resulting data is provided on the execute Result signal and typically written into register file 228 at the conclusion of the machine cycle.

In the present embodiment of the invention, pipeline control logic 218 will assert the $\overline{\text{Exception Processing}}$ signal to indicate that an exception has occurred. As an example, an exception may be generated in response to an external interrupt request. Generation of an exception in a data processing environment is well known in the art and will not be discussed in further detail herein. When the exception occurs, data processor 3 no longer executes normal processing. Rather, data processor 3 must access and execute a special exception processing routine. During the transition from normal processing to exception processing, CPU 2 of data processor 3 creates an exception stack frame which saves the information detailing the current processor context in system memory. The actual memory locations may be memory 6, slave module 12, slave module 13 or a device connected to the E-Bus.

Included in the current processor information stored in the exception stack frame is a current address of an instruction being executed at the time the exception occurred. This exception stack frame is placed on the "top" of the current system stack residing in system memory. As has been previously discussed, since operands may reside at any byte boundary, the hardware stack pointer may point to any byte boundary at the time the exception is detected. In the present embodiment of the invention, in which no operand misalignment unit is implemented, if the stack pointer is misaligned at the beginning of exception processing, the attempted creation of the exception stack frame will produce another exception and cause a catastrophic double fault condition which will halt the system's operation.

To ensure that system operation will not be halted due to a misaligned stack pointer at the time an exception is detected, the present invention has implemented a circuit and method for correcting such situations. When an exception occurs in the present invention, CPU 2 of data processor 3 first examines a current value of a stack pointer register 244. CPU 2 then automatically aligns it to the nearest 0-modulo-4 address below the current value. Once this adjustment is complete, CPU 2 stores an 8-byte stack frame which includes the type and location of the exception in system memory, which may be memory 6, slave module 12, slave module 13, or another device connected to the E-Bus. The 8-byte stack frame includes a four bit format field which contains information about the alignment of the stack pointer at the time of the exception. This operation will now be described in greater detail.

When an exception is generated, pipeline control logic 218 asserts the Exception Processing signal and provides it to operand fetch circuit 212. Additionally, pipeline control logic 218 concurrently executes an exception sequence to save a current processor state into system memory, which may be memory 6, slave module 12, slave module 13, or another device connected to the E-Bus. . During execution of this exception sequence, pipeline control logic 218 enables operand fetch circuit 212 and address generation/ execute circuit 214 to generate write cycles on K-Bus 25. The write cycles will write the information necessary to form the stack frame discussed above into memory 6. Note, the term stack frame may be used interchangeably with the term, exception stack frame.

When generating the stack frame, pipeline control logic 218 first provides control information which enables stack pointer register 244 of register file 228 (illustrated in FIG. 4) to output an "adjusted" stack pointer value to multiplexer 246. This adjustment process involves truncating the current value of the stack pointer register 244 to the nearest 0-modulo-4 address by forcing the low-order two bits to zero. This truncation operation is performed by AND gates 272 and 274. During normal processing, the Exception Processing signal is negated and, therefore, AND gates 272 and 274 simply pass the current value of the low-order two bits, SP(1:0), of stack pointer register 244. Once an exception is detected and pipeline control logic 218 asserts the Exception Processing signal, the outputs of AND gates 272 and 274 are forced to zero, thereby creating a 0-modulo-4 address. Additionally, stack pointer register 244 outputs the low-order two bits, SP(1:0), to other execute engines 256. The adjusted stack pointer is provided to multiplexer 246, which passes this value on the A output to multiplexer 2 230 and then the value is loaded into register A 234.

While the adjusted stack pointer value is being transferred from register file 228 to register A 234, multiplexer 226 generates a constant of "−4." The constant, −4, is then transferred to multiplexer 232 and subsequently stored in register B 236. At this point, the adjusted stack pointer value is stored in register A 234 and the constant, −4, is stored in register B 236. The adjusted stack pointer value corresponds to the "X" illustrated in the various examples illustrated in FIG. 7.

Next, register A 234 provides the adjusted stack pointer value to multiplexer 250 of address generation/execute circuit 214 via the RA signal. Similarly, register B 236 provides the constant, −4, to multiplexer 252 of address generation/execute circuit 214 via the RB signal. ALU 254 subsequently sums the two values to provide an output having a value of the adjusted stack pointer value (X) plus the −4 constant, i.e., (X−4). The output of ALU 254 is provided to multiplexer 258 via the Execute Result signal. From multiplexer 258, the X−4 value is provided to multiplexer 222 as the Operand Address signal. Multiplexer 222 provides the Operand Address signal to register 208. In this manner, the operand address for the K-Bus 25 cycle to perform the first thirty-two bit exception stack frame store is generated.

The X−4 address value is also provided on the Execute Result signal to multiplexer 230 and then to register A 234. At the start of a next timing cycle, register A 234 stores the X−4 value and register B 236 stores the constant, −4. Again, pipeline control logic 218 provides control information which enables register A 234 to provides the X−4 value to multiplexer 250 of address generation/execute circuit 214 via the RA signal. Similarly, register B 236 provides the constant, −4, to multiplexer 252 of address generation/ execute circuit 214 via the RB signal. ALU 254 subsequently sums the two values to provide an output have a value of the current stack pointer value (X−4) plus the −4 constant, i.e. (X−8). The output of ALU 254 is provided to multiplexer 258 via the Execute Result signal. Multiplexer 258 provides the Operand Address signal to multiplexer 222 and then to register 208. In this manner, the operand address for the K-Bus 25 cycle to perform the second thirty-two bit exception stack frame store is generated. Additionally, the X−8 value provided on the Execute Result signal is written into stack pointer register 244 to reflect the top of the system stack at the conclusion of the exception stack frame writes.

While the addresses required to write data are being generated, the data to be stored in the exception stack frame must also be accessed. As the X−4 address value is being formed, the PC value is provided to other execute engines 256. The PC value is a program counter value of the faulting instruction. The value of the PC defines the instruction address of the instruction currently in operand execution pipeline 220 and is accessed from operand fetch circuit 212.

When the program value is generated and provided to other execute engines 256 via the PC signal, the PC value is provided to multiplexer 260 together with the status register (SR) value, the Format (F) value, and the Vector (V) value. The SR value is generated in response to state information generated by ALU 254 of address generation/execute logic 214. The state information produced by ALU 254 is output to logic circuit 253 via the Execute Result signal. Logic circuit 253 processes the state information to provide a status value which is stored in status register 257. Status register 257 subsequently provides the status value to other execute engines 256 via the SR value.

The Vector value is generated by pipeline control logic 218 to indicate the type of the current exception. This value will be subsequently used to access a vector defining the instruction address of the exception handling software routine.

The Format value is a four bit field which defines an alignment of the stack pointer at the time the exception was asserted. The Format value is generated by logic 259 in response to bits one and zero of the stack pointer value at the time of the exception, i.e., SP(1:0). The following table indicates the relationship between the stack pointer values and the format values effectuated by logic 259.

TABLE 1

| Original SP(1:0) at the Time of the Exception | SP at the First Instruction of the Exception Handler | Format Field |
|---|---|---|
| 00 | Original SP - 8 | 0100 |
| 01 | Original SP - 9 | 0101 |
| 10 | Original SP - 10 | 0110 |
| 11 | Original SP - 11 | 0111 |

Therefore, with reference to Table 1, when SP(1:0) has a binary value of %00, logic 259 provides a format field having a corresponding binary value of %0100. Similarly, when SP(1:0) has a binary value of %01, logic 259 provides a format field having a binary value of %0101. When SP(1:0) has a binary value of %10, logic 259 provides a format field having a corresponding binary value of %0110. Additionally, when SP(1:0) has a binary value of %11, logic 259 provides a format field having a binary value of %0111. This format field of the exception stack frame will later be used by the processor to restore stack pointer register 244 back to its original value once the exception has been processed by the handler routing.

When the exception is being processed, pipeline control logic 218 provides control information (not illustrated herein) to enable multiplexer 260 to provide one of the SR, PC, Format (F), and Vector (V) values to register 262. First, pipeline control logic 218 provides control information which enables multiplexer 260 to select and transfer the PC value to register 262. From register 262, the PC value is provided to buffer 216 via the Operand Write Data signal. Buffer 216 then drives the PC value to K-Bus 25 via the KWDATA (K-Bus Write Data) signal. Subsequently, the PC value is stored in the memory location defined by the X−4 value concurrently generated in the first timing cycle.

During the second timing cycle, in which the X−8 address is generated, pipeline control logic 218 provides control information which enables multiplexer 260 to select and transfer the SR, Format (F), and Vector (V) values to register 262. From register 262, the SR, Format, and Vector values are concatenated in an order illustrated in FIG. 7 and provided to buffer 216 via the Operand Write Data signal. Buffer 216 then drives the concatenated value to K-Bus 25 via the KWDATA (K-Bus Write Data) signal. Subsequently, the Format/Vector/Status Register value is stored into a system memory location defined by the X−8 value concurrently generated in the second timing cycle.

After the exception stack frame is generated and the PC, SR, Format and Vector values are stored in system memory, the exception is then processed by data processor 3. At this point, the Vector value provided by pipeline control logic 218 is provided to multiplexer 226 in operand fetch circuit 212. From multiplexer 226, the Vector value is provided to multiplexer 230 and then stored in register A 234. From register A 234, the Vector value is provided to multiplexer 250 via the RA signal. Concurrent with the Vector generation, a Vector Base Register (VBR) is read in other execute engines 256 and sent to multiplexer 232 via the Execute Result signal. The VBR provides the ability to "relocate" the exception vector table within the system memory. The VBR value is gated through multiplexer 232 and loaded into register B 236. The Vector value is then summed with the VBR value in ALU 254 to generate a vector address which defines the location in the system memory containing the instruction address which corresponds to the generated exception. The sum provided by ALU 254 is provided to multiplexer 258. When appropriate control is provided to multiplexer 258 by pipeline control logic 218, multiplexer 258 provides the vector address as the Operand Address signal. The Operand Address signal is subsequently provided to multiplexer 222. From multiplexer 222, the vector number is output as the KADDR signal by buffer 208. The KADDR signal is used by K-Bus 25 to read the desired exception vector.

The retrieved vector is transferred to buffer 216 via the KRDATA signal. From buffer 216, the retrieved vector is provided to operand fetch circuit 212 by the KRDATA Buffer signal. The KRDATA Buffer signal is connected to the Execute Result signal to transfer the retrieved vector. The retrieved vector is subsequently provided to multiplexer 230 and stored in register A 234. From register A 234, the retrieved vector is provided to multiplexer 250 via the RA signal. Multiplexer 250 transfers the retrieved vector to ALU 254 where it is summed with zeroes produced by multiplexer 252 under control of pipeline control logic 218. ALU 254 essentially passes the retrieved vector onto the Execute Result signal where it provides an input to multiplexer 258 and then multiplexer 222. The retrieved vector is then loaded into KADDR register 208. This address represents the instruction fetch address for the starting instruction for the exception handling program. From register 208, the exception fetch address is provided to K-Bus 25 via the KADDR signal.

As the initial instruction fetch for the software program for handling the exception is made and data retrieved, the instruction data is provided back to CPU 2 via the KRDATA signal. Specifically, the KRDATA signal is provided by buffer 216 to instruction fetch circuit 204. Fetched instructions are then gated through multiplexer 219 (optionally using FIFO instruction buffer 206) to load the fetched instructions into operand execution pipeline 220. The process described in detail above initiates and executes the software program for handling the exception.

When the software program for handling the exception is completed, data processor 3 will cease exception processing and return to normal processing. In order to return to normal processing, the context in which data processor 3 was operating before the exception occurred must be restored. Therefore, the program counter, the status register, and the stack pointer must be restored to the original values they had before the exception occurred. The unique use of the exception stack frame for storing the format field which defines the alignment of the stack pointer at the time of the exception is essential for correct and efficient restoration of data processor 3 to the previous state.

Figure 7:
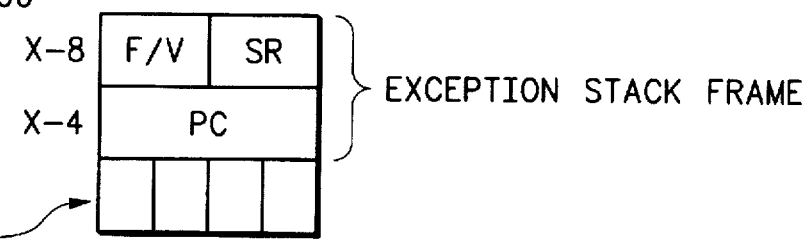
FIG. 7 illustrates, in block diagram form, a structure of an exception stack frame for a plurality of stack pointer (SP) register values.
Figure 7:
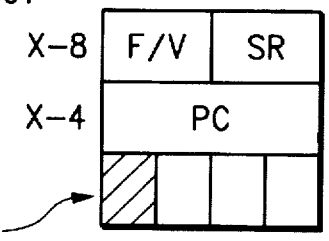
Figure 7:
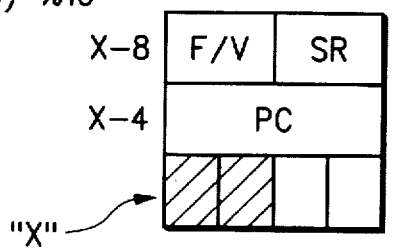
Figure 7:
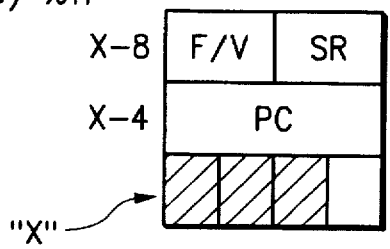
Figure 8:
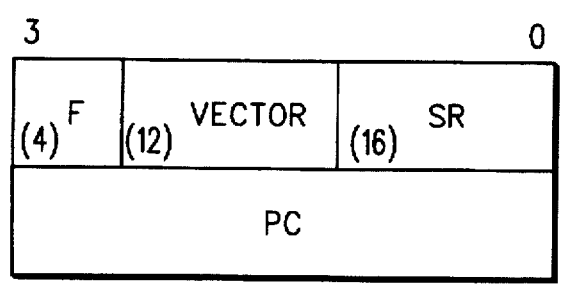
FIG. 8 illustrates, in block diagram form, a structure of an exception stack frame which includes a four bit format field.

The last instruction in the software program for handling an exception must be an RTE (Return from Exception) instruction. When the RTE instruction is executed, the two longword values stored on the exception stack frame (as illustrated in FIG. 7) will be retrieved. To retrieve these values, a current stack pointer value is retrieved from stack pointer register 244 of register file 228. Remember, at the beginning of the software execution program, the value of the stack pointer was X−8. Although the stack area may be used for temporary storage during execution of the exception handling program, the stack pointer must again contain a value of X−8 as the RTE instruction begins execution. The stack pointer value is provided to multiplexer 246 to be communicated via the A signal. The A signal is provided to multiplexer 230 and then transferred to register A 234. At the same time, multiplexer 226 generates a constant value of +4. The constant value, 4, is transferred from multiplexer 226 to multiplexer 232 and stored in register B 236.

In a next timing cycle, the contents of register A 234, the X−8 value, are provided to multiplexer 258 by the RA signal. Multiplexer 258 then provides the X−8 value to multiplexer 222 via the Operand Address signal. From multiplexer 222, the X−8 value is stored in register 208. The X−8 value is subsequently provided to K-Bus 25 via the KADDR signal. Data is then accessed at the address location in system memory specified by the X−8 value.

Concurrent with the formation of X-8 as the operand address, register A 234 containing the X−8 value and register B 236 containing the +4 value are respectively transferred to multiplexer 250 and multiplexer 252. Under control provided by pipeline control logic 218, multiplexer 250 and multiplexer 252 transfer the X−8 value and the constant 4 to ALU 254. ALU 254 adds the two values to generate a result of X−4. The result is provided to the Execute Result signal which then transfers the X−4 value to multiplexer 230. Multiplexer 230 provides the X−4 value to register A 234.

Referring to FIG. 7, when the address location specified by the X−8 value is accessed, the Format (F), Vector (V), and SR values are accessed. The Format, Vector, and SR values are provided to buffer 216 via the KRDATA signal. From buffer 216, the Format, Vector, and SR values are provided to multiplexer 232 of operand fetch circuit 212 via the Buffer KRDATA signal and the Execute Result signal. These values are then gated in register B 236. From register B 236, the Format, Vector and SR values are provided to multiplexer 252 via the RB signal. The entire contents of register B 236 are subsequently passed through ALU 254 without modification and processed by logic circuit 253 to provide a status value. The status value is then stored in status register 257 to indicate an operating context of data processor 3 when the exception occurred. Similarly, from register B 236, the Format value is provided to other execute engines 256 via the RB signal. The Format value is subsequently stored in register 261.

In a subsequent timing cycle, the X–4 value stored in register A 234 is provided to multiplexer 258 by the RA signal. The RA signal transfers the X–4 value to multiplexer 222 and then to register 208. The X–4 value is subsequently provided to K-Bus 25 via the KADDR signal. Data is then accessed at the address location in system memory specified by the X–4 value.

Referring again to FIG. 7, when the address location specified by the X–4 value is accessed, the program counter (PC) value is accessed. The PC value is provided to buffer 216 via the KRDATA signal. From buffer 216, the PC value is provided to operand fetch circuit 212 via the Buffer KRDATA signal. The PC value is gated onto the Execute Result signal and routed to multiplexer 232, where it is passed and loaded into register B 236. At this point in time, register A 234 contains the X–4 value and register B 236 contains the new program counter address.

In the next timing cycle, the register B 236 value, containing the new program counter address, is transferred to multiplexer 258. This address is then transferred to multiplexer 222 via the Operand Address signal where it is loaded into register 208. This address defines the instruction address to resume execution after processing the exception. The KADDR register 208 is then used to access the desired instruction from system memory to resume the execution of the program. The desired instruction is returned on KRDATA, passed through buffer 216 into instruction fetch circuit 204.

In a subsequent timing cycle, the Format value is retrieved from register 261 via the Execute Result signal. This value is then sent to multiplexer 232 and loaded into register B 236. At this time, register A 234 still contains the X–4 value, and register B contains the Format field. In the next timing cycle, the contents of both multiplexer 250 and multiplexer 252 are provided to ALU 254 which sums the two values, i.e., X–4+Format.

The summation recreates the original stack pointer value at the time of the exception. The ALU output is gated onto the Execute Result signal and stored in stack pointer register 244 of register file 228 as the current stack pointer.

At this point, the data processor 3 has completely restored the state of the machine back to its value at the time of the exception: the instruction fetch pipeline 210 is fetching instructions at the restored program counter value, and the stack pointer register 244 has been restored to the value at the time of the exception. The self-aligning characteristics of the current invention enable the stack pointer to automatically align itself to the nearest 0-modulo-4 address below the current stack pointer setting when an exception is received. When the exception has been processed and data processor 3 is beginning to operate in a normal mode of operation, the stack pointer must be returned to its original value, even if that value was misaligned at the time the exception was received. The addition of the format field to the interim X–4 value of the stack pointer provides a unique and efficient method for returning the stack pointer to its initial value.

Consider the following example taken from a well-known benchmark:

| Instruction Address | Opcode | |
|---|---|---|
| $00005064: | mov.b (a0),-(sp) | #copy byte from source to stack |
| $00005066: | bra.b L%1 | #continue at L%1 |

The contents of the stack pointer before executing the instruction at address $00005064 is $00006ed0. The mov.b opcode at address $00005064 copies one byte of data (let the data be $aa) from a source location defined by the contents of register a0 onto the system stack and decrements the stack pointer by 1. At the conclusion of this instruction, the stack pointer value is $00006ecf.

Suppose an interrupt request then arrived, causing the execution of the instruction at address $00005056 to be postponed to service the interrupt request. As the interrupt exception is processed, the following exception stack frame is created:

| Address | Data |
|---|---|
| $00006ec4 | $70780008 #format = $7, vector = $078, status = $0008 |
| $00006ec8 | $00005066 #instruction address |
| $00006ecc | $-----aa #data copied by mov.l opcode | where the stack pointer register value at the beginning of the exception handling software program is $00006ec4.

After the interrupt request is serviced, the exception handler executes an RTE instruction. The 32 bits of data at the top of the stack is fetched and the Format, Vector and SR fields processed by the CPU 2 as previously described. The interim X–4 address of $00006ec8 is formed and temporarily saved in register A 234. The instruction address of $00005066 is fetched from location $00006ec8 and used to establish a new instruction stream. Concurrently, the saved format field ($7) is summed in ALU 254 with the contents of register 234 ($00006ec8) to form the restored stack pointer ($00006ec8+$00000007=$00006ecf), which is loaded into the stack pointer register 244 of the register file 228. Control then resumes with the execution of the instruction at address $00005066.

In summary, the present invention provides a data processor and method of operating a data processing system in which a single system stack pointer may be used to create records of both supervisor and user stack operations when hardware support for alignment of such stack operands is optional. The single system stack pointer is implemented as a self-aligning stack pointer which automatically aligns itself to a nearest 0-modulo-4 address below the current address setting such that no system errors occur even when there is no hardware support for misaligned operands. Once the automatic alignment has occurred, the data processor of the present invention stores a four bit format field in an exception stack frame to indicate information about the alignment of the stack pointer at the time of the fault. When the exception has been serviced and a return from exception (RTE) instruction is executed, the processor uses the four bit format field stored in the exception stack frame to restore the stack pointer to its original value at the time of the exception.

The implementation of the invention described herein is provided by way of example only and many other implementations may exist for executing the function described herein. For example, the constant generated and used to create addresses for the exception stack frame is not constrained to be −4, but may be any number desired by a designer or user of data processing system 5.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

We claim:

1. A method for operating a data processing system, comprising the steps of:
   receiving a first signal within the data processing system indicating a first predetermined condition has occurred;
   retrieving a current address value from a stack pointer register;
   aligning the current address value to a nearest 0-modulo-4 address next to the current address value; and
   storing a format field value in a memory, the format field indicating a manner in which the current address value was aligned at the time of receiving the first signal indicating the first predetermined condition has occurred.

2. The method of claim 1 wherein the first predetermined condition is a exception processing condition.

3. The method of claim 1 wherein a step of aligning, further comprises the steps of:
   negating a predetermined portion of the current address value retrieved from the stack pointer register.

4. The method of claim 1 further comprising the steps of:
   receiving a second signal within the data processing system indicating a second predetermined condition has occurred;
   retrieving the format field value from the memory; and
   restoring the current address value to the stack pointer register.

5. A data processor, comprising:
   bus means for providing a plurality of address values and a plurality of data values to the data processor;
   control means for determining when an exception in operation has occurred and providing an exception processing signal in response thereto;
   a register for indicating a current address value accessed when the exception in operation has occurred;
   a logic circuit coupled to the register for receiving a first portion of the current address value and coupled to the control means for receiving the exception processing signal, the logic circuit selectively modifying the current address value to form an adjusted address value; and
   a format generation circuit coupled to the register for receiving at least the first portion of the current address value, the format generation circuit modifying the first portion of the current address value to generate a stack alignment value to indicate an alignment of the current address value when the exception in operation has occurred.

6. The data processor of claim 5 further comprising a memory coupled to the format generation circuit for storing the stack alignment value.

7. The data processor of claim 5 wherein the current address value is stored in the register when the exception in operation has occurred and been completed.

8. The data processor of claim 5 the adjusted address value is a nearest 0-modulo-4 address less than the current address value.

9. A data processor, comprising:
   control means for generating a first data processor interrupt signal;
   a stack pointer register for storing and providing a current address value having a first portion and a second portion;
   a logic circuit coupled to the control means for receiving the first interrupt signal and coupled to the stack pointer for receiving a first portion of the current address value, the logic circuit creating an adjusted address value; and
   a converter circuit coupled to the stack pointer register for receiving a second portion of the current address value, the converter circuit generating a format field which, when summed with the adjusted address value will generate the current address value.

10. The data processor of claim 9 wherein the format field is stored in a memory of the data processor.

11. The data processor of claim 10 wherein the format field is retrieved from the memory of the data processor and used to restore the current address value to the stack pointer register.

12. The data processor of claim 9 wherein the adjusted address value is a nearest 0-modulo-4 address value less than the current address value.

* * * * *